United States Patent
Chabot et al.

(10) Patent No.: US 10,118,125 B1
(45) Date of Patent: Nov. 6, 2018

(54) PROCESS FOR REMOVING H2S FROM GAS STREAM BY CALCIUM BASED REACTION SEPARATION

(71) Applicant: EXP SERVICES INC., Brampton (CA)

(72) Inventors: Stéphane Chabot, Lévis (CA); Yves Charest, Ancienne-Lorette (CA); Martin Beaulieu, Sainte-Foy (CA); Abderrahman Mahfoud, Charny (CA)

(73) Assignee: EXP SERVICES INC., Brampton (CA)

( * ) Notice: Subject to any disclaimer, the term of this patent is extended or adjusted under 35 U.S.C. 154(b) by 77 days.

(21) Appl. No.: 15/521,252

(22) PCT Filed: Oct. 23, 2015

(86) PCT No.: PCT/CA2015/051081
§ 371 (c)(1),
(2) Date: Apr. 21, 2017

(87) PCT Pub. No.: WO2016/061697
PCT Pub. Date: Apr. 28, 2016

Related U.S. Application Data

(60) Provisional application No. 62/068,198, filed on Oct. 24, 2014.

(51) Int. Cl.
| | | |
|---|---|---|
| *B01D 53/52* | (2006.01) | |
| *B01D 53/73* | (2006.01) | |
| *B01D 53/78* | (2006.01) | |
| *B01D 53/14* | (2006.01) | |
| *C01F 11/46* | (2006.01) | |
| *C01F 11/48* | (2006.01) | |

(52) U.S. Cl.
CPC ......... *B01D 53/52* (2013.01); *B01D 53/1468* (2013.01); *B01D 53/1493* (2013.01); *B01D 53/73* (2013.01); *B01D 53/78* (2013.01); *C01F 11/46* (2013.01); *C01F 11/48* (2013.01); *B01D 2251/404* (2013.01)

(58) Field of Classification Search
None
See application file for complete search history.

(56) References Cited

U.S. PATENT DOCUMENTS

| 4,884,396 A | 12/1989 | Miyamoto et al. |
| 2014/0109801 A1* | 4/2014 | Sipple ............... C04B 7/436 |
| | | 106/819 |

FOREIGN PATENT DOCUMENTS

JP 2004-256684 * 9/2004 ............. B01D 53/22

OTHER PUBLICATIONS

English Abstract of JP2004256684(A), "Method for Refining Crude Gas and Apparatus for Refining Crude Gas", published on Sep. 16, 2004.

* cited by examiner

*Primary Examiner* — Daniel Berns
(74) *Attorney, Agent, or Firm* — Bereskin & Parr LLP/S.E.N.C.R.L., s.r.l.

(57) ABSTRACT

There are provided processes for removing $H_2S$ from a gas. The processes comprise contacting the gas with an aqueous composition comprising at least one calcium compound, thereby obtaining CaS and a $H_2S$ lean treated gas stream, while maintaining the pH at about 9.5 to about 13.0; and contacting the CaS with an aqueous oxidant solution, converting the CaS into at least one of $CaSO_3$ and $CaSO_4$, while maintaining the pH at about 9.5 to about 13.0.

20 Claims, 1 Drawing Sheet

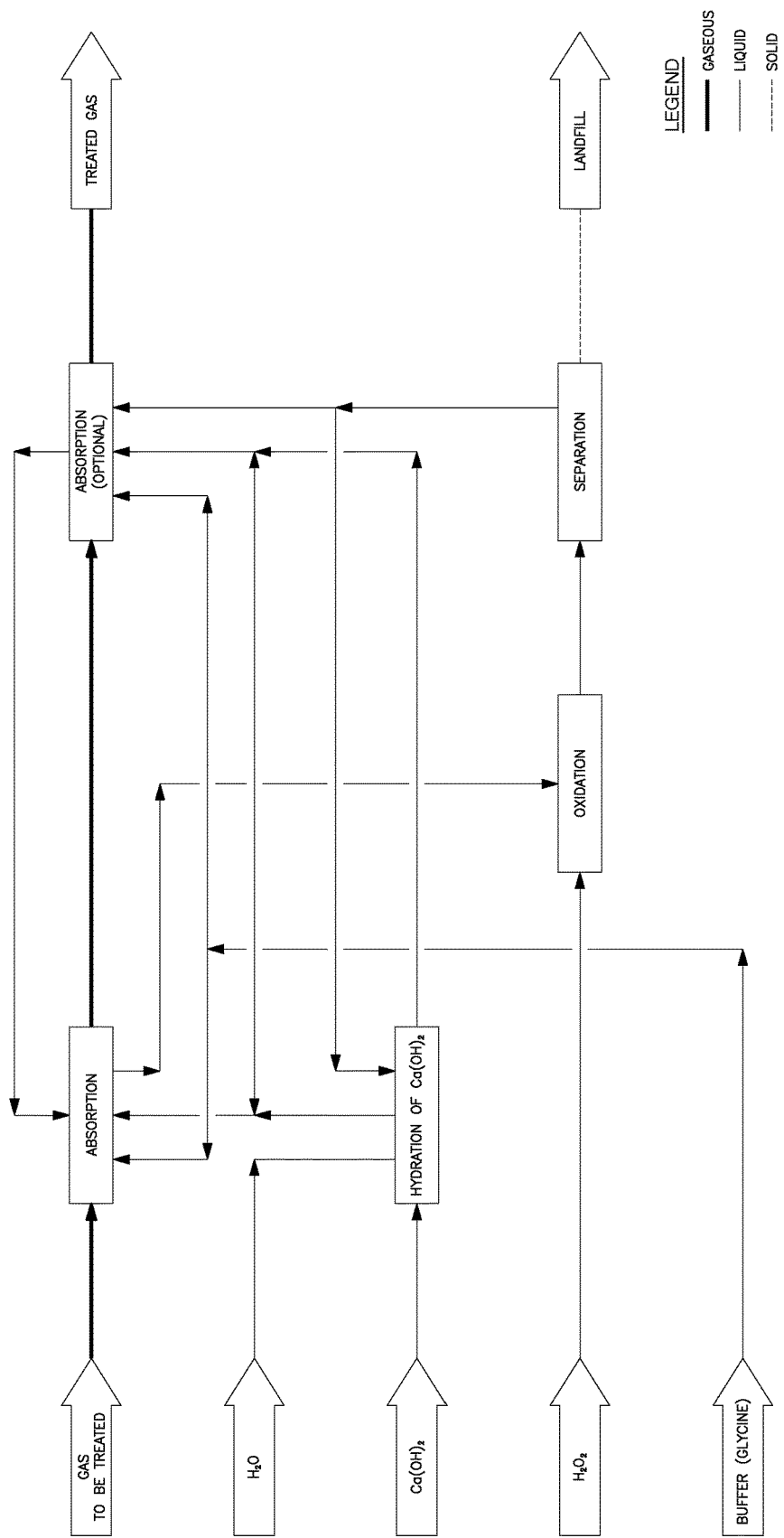

PROCESS FOR REMOVING H2S FROM GAS STREAM BY CALCIUM BASED REACTION SEPARATION

CROSS REFERENCE TO RELATED APPLICATIONS

The present application is a 35 USC 371 national stage entry of PCT/CA2015/051081 filed on Oct. 23, 2015 and which claims priority on U.S. 62/068,198 filed on Oct. 24, 2014. These documents are hereby incorporated by reference in their entirety.

FIELD

The present disclosure broadly relates to a process for removing $H_2S$ from a gas stream by calcium based reaction separation. The present disclosure also relates to a process for the preparation of calcium sulfite and/or calcium sulfate from a gas stream comprising $H_2S$.

BACKGROUND

The following is not an admission that anything discussed below is part of the prior art or part of the common general knowledge of a person skilled in the art.

Hydrogen sulfide ($H_2S$) is a chemical compound commonly associated with the odor or rotten eggs and it is a frequent component of industrial flue gases as well as sewage treatment. In addition to its pungent odor, hydrogen sulfide is toxic, corrosive and flammable. It is also frequently accompanied by other sulfur compounds that are also considered pollutants.

There are technologies to remove these compounds from a gas stream, but these technologies are limited to low concentrations of hydrogen sulfide.

SUMMARY

In an aspect, the present disclosure includes a process for removing $H_2S$ from a gas, the process comprising:

contacting the gas with an aqueous composition comprising at least one calcium compound, thereby obtaining CaS and a $H_2S$ lean treated gas stream; and contacting the CaS with an aqueous oxidant solution, converting the CaS into at least one of $CaSO_3$ and $CaSO_4$.

In another aspect, the present disclosure includes a process for producing at least one of $CaSO_3$ and $CaSO_4$ from a gas containing $H_2S$, the method comprising:

contacting the gas with an aqueous composition comprising at least one calcium compound, thereby obtaining CaS and a $H_2S$ lean treated gas stream; and contacting the CaS with an aqueous oxidant solution, converting the CaS into at least one of $CaSO_3$ and $CaSO_4$.

In another aspect, the present disclosure includes a process for removing $H_2S$ from a gas, the process comprising:

contacting the gas with an aqueous composition comprising at least one calcium compound, thereby obtaining CaS and a $H_2S$ lean treated gas stream, while maintaining the pH at about 9.5 to about 13.0; and contacting the CaS with an aqueous oxidant solution, converting the CaS into at least one of $CaSO_3$ and $CaSO_4$, while maintaining the pH at about 9.5 to about 13.0.

In another aspect, the present disclosure includes a process for producing at least one of $CaSO_3$ and $CaSO_4$ from a gas containing $H_2S$, the method comprising:

contacting the gas with an aqueous composition comprising at least one calcium compound, thereby obtaining CaS and a $H_2S$ lean treated gas stream, while maintaining the pH at about 9.5 to about 13.0; and contacting the CaS with an aqueous oxidant solution, converting the CaS into at least one of $CaSO_3$ and $CaSO_4$ while maintaining the pH at about 9.5 to about 13.0.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

BRIEF DESCRIPTION OF THE DRAWINGS

The drawings included herewith are for illustrating various embodiments of the present disclosure and are not intended to limit the scope of what is taught in any way.

FIG. 1 is a simplified flow sheet of a process in accordance with an embodiment of the present disclosure. For example, the process can remove up to 99.9% of hydrogen sulfide from a flue gas having a concentration from about 300 ppmv up to about 6500 ppmv of $H_2S$.

DESCRIPTION

In order to provide a clear and consistent understanding of the terms used in the present specification, a number of definitions are provided below. Moreover, unless defined otherwise, all technical and scientific terms as used herein have the same meaning as commonly understood by one of ordinary skill in the art to which this specification pertains.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used in this specification and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

Terms of degree such as "about", "substantially" and "approximately" as used herein mean a reasonable amount of deviation of the modified term such that the end result is not significantly changed. These terms of degree should be construed as including a deviation of ±10% of the modified term if this deviation would not negate the meaning of the word it modifies.

For example, in the processes of the present disclosure, the at least one calcium compound can be chosen from CaO, Ca(OH)$_2$ and a mixture thereof.

For example, in the processes of the present disclosure, the at least one calcium compound can be Ca(OH)$_2$.

For example, in the processes of the present disclosure, the at least one calcium compound can be obtained by reacting CaO and water in accordance with equation:

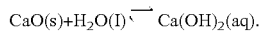

$$CaO(s) + H_2O(l) \rightleftharpoons Ca(OH)_2(aq).$$

For example, in the processes of the present disclosure, the gas can comprise a concentration of H$_2$S from about 300 ppmv to about 6500 ppmv.

For example, in the processes of the present disclosure, when contacting the gas with an aqueous solution comprising at least one calcium compound, the pH can be maintained at about 10.0 to about 12.5, about 10.5 to about 12.0, about 10.0 to about 12.5, or about 10.5 to about 12.0.

For example, in the processes of the present disclosure, the pH can be maintained using an aqueous buffer solution.

For example, in the processes of the present disclosure, the aqueous buffer solution can comprise glycine (for example glycine having concentration from about 20 mM to about 100 mM, about 30 mM to about 70 mM or about 50 mM).

For example, in the processes of the present disclosure, the oxidant can comprise an aqueous peroxide solution.

For example, in the processes of the present disclosure, at least one of CaSO$_3$ and CaSO$_4$ can be isolated to provide a solid mixture of the least one of CaSO$_3$ and CaSO$_4$ and a residual aqueous buffer solution.

For example, in the processes of the present disclosure, at least one of CaSO$_3$ and CaSO$_4$ can be isolated using a rotating filter, a stationary filter, a cyclone, a hydrocyclone, and/or a sedimentation equipment.

For example, in the processes of the present disclosure, the residual aqueous buffer solution can be recirculated for maintaining the pH when contacting the gas with an aqueous solution comprising at least one calcium compound at about 9.5 to about 13.0, about 10.0 to about 12.5 or about 10.5 to about 12.0.

For example, in the processes of the present disclosure, the residual aqueous buffer solution can be recirculated for maintaining the pH when contacting the CaS with an aqueous oxidant solution at about 9.5 to about 13.0, about 10.0 to about 12.5 or about 10.5 to about 12.0.

For example, in the processes of the present disclosure, the residual aqueous buffer solution can be recirculated for maintaining both the pH when contacting the gas with an aqueous solution comprising at least one calcium compound and contacting the CaS with an aqueous oxidant solution at about 9.5 to about 13.0, about 10.0 to about 12.5 or about 10.5 to about 12.0.

For example, in the processes of the present disclosure, contacting the gas with an aqueous solution can comprise at least one calcium compound comprises using at least one absorption tower.

For example, in the processes of the present disclosure, contacting the CaS with an aqueous oxidant solution can comprise using a conversion reactor.

For example, in the processes of the present disclosure, contacting the gas with an aqueous solution comprising at least one calcium compound and the contacting the CaS with an aqueous oxidant solution can be monitored by ORP measurement.

For example, in the processes of the present disclosure, the H$_2$S lean treated gas stream can be subjected to a second contacting with an aqueous solution comprising at least one calcium compound, thereby reacting any residual H$_2$S to form CaS while maintaining the pH at about 9.5 to about 13.0; and wherein the CaS is contacted with an aqueous oxidant solution, converting the CaS into at least one of CaSO$_3$ and CaSO$_4$ while maintaining the pH at about 9.5 to about 13.0.

For example, in the processes of the present disclosure, from about 95% to about 99.9% of the H$_2$S can be converted into the at least one of CaSO$_3$ and CaSO$_4$.

For example, in the processes of the present disclosure, the gas can be a flue gas or a tail gas.

A process flow sheet for an exemplary embodiment of a process for removing H$_2$S from a gas stream is shown in FIG. 1. FIG. 1 exemplifies a process for removing H$_2$S from a gas stream with the concomitant formation of calcium sulfite (CaSO$_3$) and/or calcium sulfate (CaSO$_4$). The gas stream is contacted with an aqueous composition comprising at least one calcium compound, whereby H$_2$S is converted into CaS and removed from the gas stream. The pH is maintained at about 9.5 to about 13.0. In an embodiment of the present disclosure, the process is repeated a second time in order to remove any untreated residual H$_2$S from the gas stream.

Referring to FIG. 1, a H$_2$S containing feed gas stream is treated with an aqueous composition comprising at least one calcium compound to obtain an H$_2$S lean feed gas stream. The feed gas stream may be any stream which contains H$_2$S levels, e.g. suitable for treatment for H$_2$S removal before the gas is released to the atmosphere or cycled to a stack, such as flue gas from a fluid catalytic cracker unit, an acid plant tail gas or the like.

An H$_2$S lean stream is prepared by contacting a feed gas stream with an aqueous composition comprising at least one calcium compound as an absorbent (absorbing medium). The at least one calcium compound absorbent is prepared by reacting dry Ca(OH)$_2$ and water in order to obtain an aqueous composition comprising Ca(OH)$_2$.

The calcium based absorbent under the form of an aqueous composition Ca(OH)$_2$ may be contacted with the feed gas stream using any means known in the art. As exemplified in FIG. 1, the feed gas stream flows into a gas-liquid contact apparatus, where intimate contact between the feed gas stream and the aqueous composition occurs. The apparatus may be any gas-liquid contactor or absorption tower known in the art, such as a spray or packed tower. Illustrative contacting devices include countercurrent absorption columns including packed columns and tray columns, countercurrent or co-current spray columns including Waterloo scrubbers, venturi scrubbers; thin film contactors and semipermeable membranes. H$_2$S is absorbed by the aqueous composition producing an effluent composition comprising CaS, which exits from the gas-liquid contact apparatus and is cycled to a conversion reactor.

The amount of absorbing medium employed per unit volume of gas and the contact time may be sufficient to effect removal of substantially all the H$_2$S from the gas stream. In an embodiment of the present disclosure, the residual amount of H$_2$S in the lean feed gas stream is about 50 ppm to less than 1 ppm. In non-limiting embodiments, for example, the composition may comprise about 50.0, about 49.0, about 48.0, about 47.0, about 46.0, about 45.0, about 44.0, about 43.0, about 42.0, about 41.0, about 40.0, about 39.0, about 38.0, about 37.0, about 36.0, about 35.0, about 34.0, about 33.0, about 32.0, about 31.0, about 30.0, about 29.0, about 28.0, about 27.0, about 26.0, about 25.0, about 24.0, about 23.0, about 22.0, about 21.0, about 20.0, about 19.0, about 18.0, about 17.0, about 16.0, about 15.0, about 14.0, about 13.0, about 12.0, about 11.0, about 10.0, about 9.0, about 8.0, about 7.0, about 6.0, about 5.0, about 4.0, about 3.0, about 2.0, about 1.0, about 0.9, about 0.8, about 0.7, about 0.6, about 0.5, about 0.4, about 0.3, about 0.2, about 0.1 or about 0.01 ppm, or any range derivable therein. Any residual $H_2S$ can be removed following a second contacting with calcium based absorbent in a second gas-liquid contact apparatus The process is applicable to any $H_2S$ containing gas stream but is particularly useful for application to gas streams which contain about 300 to about 6500 ppmv $H_2S$. In non-limiting embodiments, for example, the gas stream contain about 400 to about 6000 ppmv, about 500 to about 5500 ppmv, about 600 to about 5000 ppmv, about 700 to about 4500 ppmv, about 800 to about 4000 ppmv, about 900 to about 3500 ppmv, about 1000 to about 3000 ppmv, about 1100 to about 2500 ppmv, about 1200 to about 2000 ppmv or about 1300 to about 1500 ppmv $H_2S$, or any range derivable therein.

The contact of the absorbing medium with the $H_2S$ is effected at a temperature from about 5° C. to about 80° C. In non-limiting embodiments, for example, the contact of the absorbing medium with the $H_2S$ is effected at about 10° C. to about 75° C., at about 15° C. to about 70° C., at about 20° C. to about 65° C., at about 25° C. to about 60° C., at about 30° C. to about 55° C., at about 35° C. to about 50° C. or about 40° C. to about 45° C., or any range derivable therein.

The contact of the absorbing medium with the $H_2S$ is effected in the presence of an aqueous glycine buffer solution to provide for control of the pH during the contacting with the absorbing medium. The contact of the absorbing medium with the $H_2S$ is effected at a pH of about 9.5 to about 13.0. In non-limiting embodiments, for example, the contact of the absorbing medium with the $H_2S$ is effected at a pH of about 10.0 to about 12.5, about 10.5 to about 12.0, about 11.0 to about 11.5, or any range derivable therein. In further non-limiting embodiments, for example, the contact of the absorbing medium with the $H_2S$ is effected at a pH of about 13.0, about 12.5, about 12.0, about 11.5, about 11.0, about 10.5, about 10.0 or about 9.5 or any range derivable therein.

The time of contact between the $H_2S$ containing gas stream and the absorbing medium will depend upon the intimacy of contact between the phases and the rate of conversion of the $H_2S$ into CaS.

The feed gas stream, which is reduced in $H_2S$, may be optionally contacted again with absorbing medium in another gas-liquid contact apparatus to remove any residual $H_2S$. The gas stream then leaves the apparatus as a treated feed gas stream for release into the atmosphere, for further treatment or use, or cycled to a stack.

The water balance in the overall process may be maintained by adding water, for example via the stream used for mixing $Ca(OH)_2$ with water to generate an aqueous composition comprising $Ca(OH)_2$. Alternatively, excess water can be withdrawn from the process such as by directing any excess to waste.

The CaS, which exits from the gas-liquid contact apparatus, is cycled to a conversion reactor where it is oxidized to calcium sulfite and/or calcium sulfate using an aqueous hydrogen peroxide solution. An aqueous glycine buffer solution is also cycled to the conversion reactor to provide for control of the pH during the oxidation process. The CaS oxidation is effected at a pH of about 9.5 to about 13.0. In non-limiting embodiments, for example, the CaS oxidation of the CaS is effected at a pH of about 10.0 to about 12.5, about 10.5 to about 12.0, about 11.0 to about 11.5, or any range derivable therein. In further non-limiting embodiments, for example, the CaS oxidation is effected at a pH of about 13.0, about 12.5, about 12.0, about 11.5, about 11.0, about 10.5, about 10.0 or about 9.5 or any range derivable therein. In non-limiting embodiments, for example, the aqueous hydrogen peroxide solution has a concentration ranging from about 2% (w/w) to about 50% (w/w), or any range derivable therein. In further non-limiting embodiments, for example, the aqueous hydrogen peroxide solution has a concentration of about 2% (w/w), about 3% (w/w), about 4% (w/w), about 5% (w/w), 6% (w/w), about 7% (w/w), about 8% (w/w), about 9% (w/w), about 10% (w/w), about 11% (w/w), about 12% (w/w), about 13% (w/w), 14% (w/w), about 15% (w/w), about 16% (w/w), about 17% (w/w), about 18% (w/w), about 19% (w/w), about 20% (w/w), about 21% (w/w), 22% (w/w), about 23% (w/w), about 24% (w/w), about 25% (w/w), about 26% (w/w), about 27% (w/w), about 28% (w/w), about 29% (w/w), 30% (w/w), about 31% (w/w), about 32% (w/w), about 33% (w/w), about 34% (w/w), about 35% (w/w), about 36% (w/w), about 37% (w/w), 38% (w/w), about 39% (w/w), about 40% (w/w), about 41% (w/w), about 42% (w/w), about 43% (w/w), about 44% (w/w), about 45% (w/w), about 46% (w/w), about 47% (w/w), about 48% (w/w), about 49% (w/w) or about 50% (w/w), or any range derivable therein. In non-limiting embodiments, for example, the aqueous glycine buffer solution has a glycine concentration ranging from about 20 mM to about 100 mM. In further non-limiting embodiments, for example, the aqueous glycine buffer solution has a glycine concentration of about 20.0, about 20.5, about 21.0, about 21.5, about 22.0, about 22.5, about 23.0, about 23.5, about 24.0, about 24.5, about 25.0, about 25.5, about 26.0, about 26.5, about 27.0, about 27.5, about 28.0, about 28.5, about 29.0, about 29.5, about 30.0, about 30.5, about 31.0, about 31.5, about 32.0, about 32.5, about 33.0, about 33.5, about 34.0, about 34.5, about 35.0, about 35.5, about 36.0, about 36.5, about 37.0, about 37.5, about 38.0, about 38.5, about 39.0, about 39.5, about 40.0, about 40.5, about 41.0, about 41.5, about 42.0, about 42.5, about 43.0, about 43.5, about 44.0, about 44.5, about 45.0, about 45.5, about 46.0, about 46.5, about 47.0, about 47.5, about 48.0, about 48.5, about 49.0, about 49.5, about 50.0, about 50.5, about 51.0, about 51.5, about 52.0, about 52.5, about 53.0, about 53.5, about 54.0, about 54.5, about 55.0, about 55.5, about 56.0, about 56.5, about 57.0, about 57.5, about 58.0, about 58.5, about 59.0, about 59.5, about 60.0, about 60.5, about 61.0, about 61.5, about 62.0, about 62.5, about 63.0, about 63.5, about 64.0, about 64.5, about 65.0, about 65.5, about 66.0, about 66.5, about 67.0, about 67.5, about 68.0, about 68.5, about 69.0, about 69.5, about 70.0, about 70.5, about 71.0, about 71.5, about 72.0, about 72.5, about 73.0, about 73.5, about 74.0, about 74.5, about 75.0, about 75.5, about 76.0, about 76.5, about 77.0, about 77.5, about 78.0, about 78.5, about 79.0, about 79.5, about 80.0, about 80.5, about 81.0, about 81.5, about 82.0, about 82.5, about 83.0, about 83.5, about 84.0, about 84.5, about 85.0, about 85.5, about 86.0, about 86.5, about 87.0, about 87.5, about 88.0, about 88.5, about 89.0, about 89.5, about 90.0, about 90.5, about 91.0, about 91.5, about 92.0, about 92.5, about 93.0, about 93.5, about 94.0, about 94.5, about 95.0, about 95.5, about 96.0, about 96.5, about 97.0, about 97.5, about 98.0, about 98.5, about 99.0, about 99.5, or about 100.0 mM, or any range derivable therein.

Following the oxidation of the CaS, the resulting $CaSO_3$ and/or $CaSO_4$ is separated from the aqueous glycine buffer solution using a rotating filter, a stationary filter, a cyclone, a hydrocyclone, sedimentation equipment or any other suitable solid/liquid separator. The aqueous glycine buffer solution is then cycled back to at least one of the first and second gas-liquid contact apparatus. Alternatively, a portion of the aqueous glycine buffer solution is maintained in the conversion reactor whereas a further portion is cycled back to at least one of the first and second gas-liquid contact apparatus. In non-limiting embodiments, additional aqueous glycine buffer solution is introduced into the process to provide for a pH of about 9.5 to about 13.0 in the at least one of the first and second gas-liquid contact apparatus and the conversion reactor.

The conversion of $H_2S$ into CaS is continuously monitored by measuring the oxidation-reduction potential (ORP) value of the effluent composition comprising CaS exiting from the gas-liquid contact apparatus. Similarly, the conversion of CaS into $CaSO_3$ and/or $CaSO_4$ is continuously monitored by measuring the ORP value of the aqueous solution in the conversion reactor. The presence of dissolved CaS in the effluent drives the effluent solution to more negative ORP values. Similarly, a gradually decreasing concentration of hydrogen peroxide, indicative of the conversion of CaS into $CaSO_3$ and/or $CaSO_4$ drives the aqueous solution of the conversion reactor to more negative ORP values. Therefore, ORP analysis reveals indirect evidence of the formation of CaS as well as $CaSO_3$ and/or $CaSO_4$ formation and thus the progress of $H_2S$ removal from the gas stream.

The exemplary embodiment of a process for removing $H_2S$ from a gas stream as shown in FIG. 1 advantageously provides for minimal liquid bleed, as substantially all of the aqueous glycine buffer solution from the conversion reactor is cycled back to at least one of the first and second gas-liquid contact apparatus or a portion thereof is maintained in the conversion reactor. Moreover, as substantially all of the CaS is converted into at least $CaSO_3$ and/or $CaSO_4$, the liquid bleed comprises low concentrations of dissolved solids.

The exemplary embodiment of a process for removing $H_2S$ from a gas stream as shown in FIG. 1 advantageously uses hydrogen peroxide as the oxidant. Hydrogen peroxide, following reaction with CaS does not produce toxic residues.

The exemplary embodiment of a process for removing $H_2S$ from a gas stream as shown in FIG. 1 advantageously uses a glycine buffer solution. The glycine buffer solution is stable in the presence of high concentrations of calcium; is stable under acidic as well alkaline conditions; and is stable in the presence of $S^{2-}$ anions.

EXPERIMENTAL

A number of examples are provided herein below. The following non-limiting examples are illustrative of the present disclosure.

Some pilot scale tests were performed in a vegetable oil extraction plant. A fraction of the gases produced by the plant was diverted for treatment in a mobile laboratory.

The following parameters were used during these tests:

Example 1, Absorption

Column 1:
  Volume of buffer solution: 5 L
  pH: 11.65
  Glycine concentration: 50 mM
  Flow rate of the buffer solution through the column: 700 ml/min
  Concentration of $H_2S$ in gas stream: 634 ppm
  Flow rate of gas stream: 20 l/min
Column 2:
  Volume of buffer solution: 5 L
  pH: 11.86
  Glycine concentration: 50 mM
  Flow rate of the buffer solution through the column: 700 ml/min
  Flow rate of gas stream: 20 l/min
Results
  Concentration of $H_2S$ after treatment: <1 ppm
  Percentage of abatement: >99%

Example 2, Absorption

Column 1:
  Volume of buffer solution: 5 L
  pH: 12.03
  Glycine concentration: 50 mM
  Flow rate of the buffer solution through the column: 700 ml/min
  Concentration of $H_2S$ in gas stream: 1138 ppm
  Flow rate of gas stream: 40 l/min
  ORP initial: −134 mV
  ORP final: −389 mV
  Duration of treatment: 1 hour
Column 2:
  Volume of buffer solution: 5 L
  pH: 12.83
  Glycine concentration: 50 mM
  Flow rate of the buffer solution through the column: 700 ml/min
  Flow rate of gas stream: 40 l/min
  ORP initial: −123 mV
  ORP final: −432 mV
  Duration of treatment: 1 hour
Results
  Concentration of $H_2S$ after treatment: 29.7 ppm
  Percentage of abatement: 97.8%

Example 3, Absorption

Column 1:
  Volume of buffer solution: 5 L
  pH: 11.66
  Glycine concentration: 50 mM
  Flow rate of the buffer solution through the column: 700 ml/min
  Concentration of $H_2S$ in gas stream: 372 ppm
  Flow rate of gas stream: 50 l/min
  ORP initial: −272 mV
  ORP final: −420 mV
  Duration of treatment: 1 h 30
Column 2:
  Volume of buffer solution: 5 L
  pH: 11.83
  Glycine concentration: 50 mM Flow rate of the buffer solution through the column: 700 ml/min
Flow rate of gas stream: 50 l/min
ORP initial: −248 mV
ORP final: −446 mV
Duration of treatment: 1 h 30

Results

Concentration of $H_2S$ after treatment: 5 ppm
Percentage of abatement: 98.7%

Example 3, Conversion

The following example shows the conversion of CaS to $CaSO_4$. For the conversion of CaS to $CaSO_4$, the initial pH is superior to 12. Under agitation, $H_2O_2$ is added and the pH is be maintained superior to 10. At the end of the reaction, after one hour, the pH is adjusted to about 11.5 to about 12.0. When the pH is superior to 12, the precipitation of $CaSO_4$ is optimized but some $Ca(OH)_2$ is loose. The residual $H_2O_2$ is returned to the absorption column to start the CaS conversion.

Volume of the buffer solution to be treated: 750 ml
Mass of $H_2S$ absorbed: 1.53 g
Mass of CaS in buffer solution: 3.23 g
pH before conversion: 12.21
Volume of $H_2O_2$ 35% (m/v) added: 22 ml
Volume $Ca(OH)_2$ 10% (m/v) added: 75.8 ml
pH after conversion: 12.47
Mass of $Ca(OH)_2$ residual: 2.18 g
Mass of total solid (dry at 150° C.): 8.09 g
Mass of $CaSO_4 \cdot \frac{1}{2}H_2O$(hemihydrate): 6.49 g [8.09 g−2.18 g]
Mass of $CaSO_4 \cdot \frac{1}{2}H_2O$ equivalent to CaS: 3.21 g.
Yield of conversion: (3.21/3.23)×100: 99.3%

The embodiments of the present disclosure are presented in such a manner in the present disclosure so as to demonstrate that every combinations of embodiments, when applicable can be made. These embodiments have thus been presented in the description in a manner equivalent to making dependent claims for all the embodiments that depend upon any of the preceding claims (covering the previously presented embodiments), thereby demonstrating that they can be combined together in all possible manners. For example, all the possible combinations, when applicable, between the various embodiments and the various processes are hereby covered by the present disclosure.

While the present disclosure has been described with reference to what are presently considered to be the preferred examples, it is to be understood that the disclosure is not limited to the disclosed examples. In particular, what has been described herein has been intended to be illustrative and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A process for removing $H_2S$ from a gas, the process comprising:
    contacting the gas with an aqueous solution comprising at least one calcium compound, thereby obtaining CaS and a $H_2S$ lean treated gas stream, while maintaining the pH at about 9.5 to about 13.0; and
    contacting the CaS with an aqueous oxidant solution, converting the CaS into at least one of $CaSO_3$ and $CaSO_4$, while maintaining the pH at about 9.5 to about 13.0.

2. The process of claim 1, wherein the at least one calcium compound is chosen from CaO, $Ca(OH)_2$ and a mixture thereof.

3. The process of any one of claim 2, wherein the at least one calcium compound is $Ca(OH)_2$.

4. The process of claim 1, wherein the gas comprises a concentration of $H_2S$ from about 300 ppmv to about 6500 ppmv.

5. The process of claim 1, wherein when contacting the gas with an aqueous solution comprising at least one calcium compound, the pH is maintained at about 10.0 to about 12.5.

6. The process of claim 1, wherein when contacting the gas with an aqueous solution comprising at least one calcium compound, the pH is maintained at about 10.5 to about 12.0.

7. The process of claim 1, wherein when contacting the CaS with an aqueous oxidant solution, the pH is maintained at about 10.0 to about 12.5.

8. The process of claim 1, wherein when contacting the CaS with aqueous oxidant solution, the pH is maintained at about 10.5 to about 12.0.

9. The process of claim 1, wherein the pH is maintained using an aqueous buffer solution.

10. The process of claim 1, wherein the oxidant comprises an aqueous peroxide solution.

11. The process of claim 1, wherein the at least one of $CaSO_3$ and $CaSO_4$ is isolated to provide a solid mixture of the least one of $CaSO_3$ and $CaSO_4$ and a residual aqueous buffer solution.

12. The process of claim 11, wherein the at least one of $CaSO_3$ and $CaSO_4$ is isolated using equipment chosen from rotating filter, a stationary filter, a cyclone, a hydrocyclone, sedimentation equipment, and combinations thereof.

13. The process of claim 11, wherein the residual aqueous buffer solution is recirculated for maintaining the pH when contacting the gas with an aqueous solution comprising at least one calcium compound, wherein the pH is maintained at about 10.5 to about 12.0.

14. The process of claim 11, wherein the residual aqueous buffer solution is recirculated for maintaining the pH when contacting the CaS with an aqueous oxidant solution, wherein the pH is maintained at about 10.5 to about 12.0.

15. (The process of claim 11, wherein the residual aqueous buffer solution is recirculated for maintaining both the pH when contacting the gas with an aqueous solution comprising at least one calcium compound and contacting the CaS with an aqueous oxidant solution, wherein the pH is maintained at about 10.5 to about 12.0.

16. The process of claim 1, wherein the contacting the gas with an aqueous solution comprising at least one calcium compound comprises using at least one absorption tower.

17. The process of claim 1, wherein the contacting the gas with an aqueous solution comprising at least one calcium compound and the contacting the CaS with an aqueous oxidant solution is monitored by ORP measurement.

18. The process of claim 1, wherein the $H_2S$ lean treated gas stream is subjected to a second contacting with an aqueous solution comprising at least one calcium compound, thereby reacting any residual $H_2S$ to form additional CaS while maintaining the pH at about 9.5 to about 13.0; and wherein the additional CaS is contacted with an aqueous oxidant solution, converting the additional CaS into at least one of $CaSO_3$ and $CaSO_4$ while maintaining the pH at about 9.5 to about 13.0.

19. The process of claim 1, wherein from about 95% to about 99.9% of the $H_2S$ is converted into the at least one of $CaSO_3$ and $CaSO_4$.

20. The process of claim 1, wherein the gas is a flue gas.

* * * * *